United States Patent
Phillips

[11] Patent Number: 5,903,072
[45] Date of Patent: May 11, 1999

[54] ELECTRIC MOTOR INPUT CIRCUIT WITH LEADLESS CAPACITOR ASSEMBLY

[75] Inventor: Patrick D. Phillips, Laingsburg, Mich.

[73] Assignee: Fasco Industries, Inc., Chesterfield, Mo.

[21] Appl. No.: 08/821,870

[22] Filed: Mar. 21, 1997

[51] Int. Cl.⁶ ............................ H02K 11/00; H02K 11/02
[52] U.S. Cl. ..................... 310/51; 310/68 C; 310/68 R; 310/71; 310/72
[58] Field of Search ................................. 310/220, 68 R, 310/51, 72, 233, 221, 71, 68 C; 361/534, 523, 306, 433, 307, 308

[56] References Cited

U.S. PATENT DOCUMENTS

| | | | |
|---|---|---|---|
| 4,158,218 | 6/1979 | McLaurin et al. | 361/308 |
| 4,329,605 | 5/1982 | Angi et al. | 310/68 R |
| 4,384,223 | 5/1983 | Zelt | 310/68 R |
| 4,571,662 | 2/1986 | Conquest et al. | 361/306 |
| 5,424,909 | 6/1995 | Kuriyama | 361/534 |
| 5,717,270 | 2/1998 | Lau et al. | 310/220 |
| 5,734,212 | 3/1998 | Uffelman | 310/51 |

*Primary Examiner*—Nestor Ramirez
*Assistant Examiner*—Tran N. Nguyen
*Attorney, Agent, or Firm*—Lorusso & Loud

[57] ABSTRACT

An electric motor input circuit including a leadless capacitor which reliably and efficiently provides the highest possible level of RFI suppression and the greatest reduction in conducted voltage transients. The assembly includes a capacitor having no solid lead wires and no epoxy coating which is snap-fit into the motor power circuit so that one of the capacitor plates is in pressing engagement with one of the input terminals and the other of the capacitor plates is in pressing engagement with a conducting tab. The conducting tab is formed on the other of the input terminals, and the capacitor is, therefore, connected between the terminals without the use of solid capacitor leads.

8 Claims, 2 Drawing Sheets

5,903,072

ELECTRIC MOTOR INPUT CIRCUIT WITH LEADLESS CAPACITOR ASSEMBLY

FIELD OF THE INVENTION

The present invention relates in general to electric motors, and in particular to an electric motor having a leadless capacitor assembly for suppression radio frequency interference and conducted voltage transients.

BACKGROUND OF THE INVENTION

As is known, electric motors include a stator and an armature (or rotor) with windings thereon. The motor is designed so that electrical current through the stator and armature windings will generate opposed magnetic fields. Rotation of the motor shaft occurs as these magnetic fields attempt to align.

In a DC motor, it is important that the input provided to the motor windings be a stable DC input having no AC component. Accordingly, it has been common practice in the industry to use a capacitor in the motor input circuit for suppression of radio frequency interference (RFI) and conducted voltage transients. Typical capacitor assemblies currently used in electric motors for reduction of RFI and conducted voltage transients have solid lead wires attached to the capacitor terminal plates and are epoxy dipped to provide insulation and strain relief for the lead wires. The capacitor is attached in parallel with the motor input terminals through the lead wires, the lengths of which are often dictated by the motor circuitry packaging. Generally, the capacitor lead wires are assembled to the motor circuit by welding, soldering, or through a splice connector.

It has been found, however, that the effectiveness of the capacitor to suppress RFI and reduce conducted transients depends directly on the length of the lead wires. A shorter capacitor lead wire provides greater RFI suppression and lower conducted voltage transients. Nonetheless, due to the physical constraints of the motor circuitry packaging, the prior art has failed to effectively minimize the length of capacitor lead wires to achieve the maximum possible suppression of RFI and conducted voltage transients.

Accordingly, there is a need in the art for an electric motor input circuit which eliminates the effect of capacitor lead wires on the suppression of RFI and conducted voltage transients.

OBJECTS OF THE INVENTION

Thus, a primary object of the present invention is to provide an electric motor input circuit having a leadless capacitor assembly which provides the highest possible level of RFI suppression and the greatest reduction of conducted voltage transients.

Another object of the present invention is to provide an electric motor input circuit having a leadless capacitor assembly which is easily and efficiently assembled.

A further object of the invention is to provide an electric motor having a capacitor assembly which is of a simple and cost efficient design.

These and other objects of the present invention will become apparent from a review of the description provided below.

SUMMARY OF THE INVENTION

The electric motor input circuit having a leadless capacitor assembly according to the present invention is organized about the concepts of: (1) providing the highest possible level of RFI suppression and the greatest reduction of conducted transients; (2) eliminating assembly operations in the assembly of electric motors; and (3) reducing the cost of electric motors which include capacitors connected to the motor power circuit.

The capacitor used in accordance with the present invention is provided without solid lead wires attached to the capacitor plates, and without an epoxy coating. To obtain the highest possible RFI suppression and the greatest reduction of conducted transients, the capacitor is assembled to the motor terminals by a direct mechanical fit between the capacitor plates and the positive and negative terminals. In a preferred method of accomplishing this mechanical fit, a metallic conducting tab is formed on one of the terminals. During assembly of the motor, the capacitor is snap-fit between the terminal and the tab so that one of the capacitor plates is in direct physical contact with the terminal, and the other of the capacitor plates is in direct physical contact with the conducting tab. As the capacitor is inserted between the terminal and the tab, the tab flexes downward, thereby forcing the capacitor plates into pressing engagement with the terminal and the tab.

Thus configured, a reliable electrical connection is made between the capacitor plates and the electrical terminals, and the solid lead wires are eliminated to maximize RFI and conducted transient suppression. Assembly operations associated with securing lead wires to the terminals are eliminated, resulting in an efficient assembly process and a corresponding reduction in assembly labor. In addition, the cost of the capacitor without lead wires and an epoxy coating is less, resulting in a reduced cost for the motor.

BRIEF DESCRIPTION OF THE DRAWING

For a better understanding of the present invention, together with other objects, features and advantages, reference should be made to the following description of the preferred embodiment which should be read in conjunction with the following figures wherein like numerals represent like parts.

DETAILED DESCRIPTION OF THE INVENTION

Figure 1:
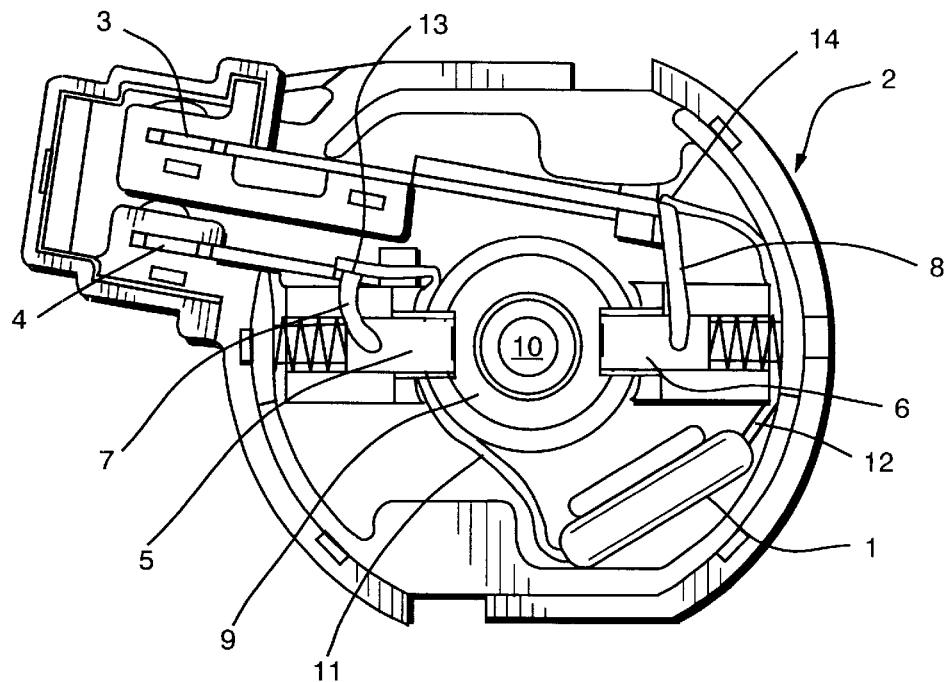
FIG. 1: is a plan view of a prior art motor end frame assembly having a capacitor connected in parallel with the motor input circuit through solid capacitor leads.

Referring to FIG. 1 of the drawing, there is shown the prior art connection of a capacitor 1 to the motor power circuit of an electric motor 2 for suppression of radio frequency interference (RFI) and conducted voltage transients. As shown the motor 2 includes first 3 and second 4 input terminals (i.e. positive and negative terminals) to which carbon brushes 5, 6 are electrically connected through coils 7, 8. As is known, the brushes electrically connect the armature windings (not shown) to the electrical input through a commutator 9. The electrical input is also supplied directly stator windings (not shown), and opposed magnetic fields are generated by current flowing through the armature and stator windings causing rotation of the motor shaft 10.

As can be seen, in the prior art, the capacitor includes lead wires 11, 12 which are connected at connection points 13, 14 to the motor input terminals 3, 4 by welding, soldering, or through a splice connector. Typically, the lead wires are connected to the capacitor terminal plates, and the capacitor is epoxy dipped in order to provide insulation and strain relief for the wires.

Figure 2:
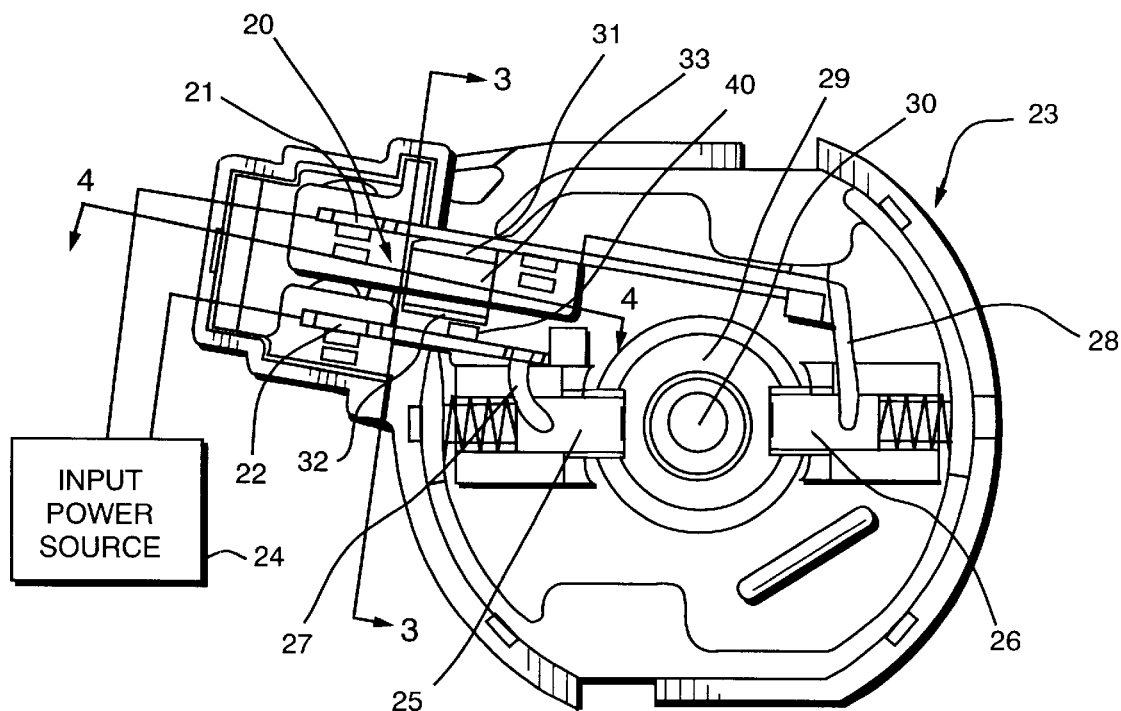
FIG. 2: is a plan view of a motor end frame assembly having a leadless capacitor connected in parallel with the motor input circuit according to the present invention.

Turning now to FIG. 2, there is shown a motor input circuit having a leadless capacitor 20 according to the present invention. As in the prior art, the first 21 and second 22 input terminals of the motor 23 receive the electrical input form an input power source 24, and connect the input to the carbon brushes 25, 26 through coils 27, 28. The brushes electrically connect the armature windings (not shown) to the electrical input through a commutator 29. The electrical input is also supplied directly stator windings (not shown), and opposed magnetic fields are generated by current flowing through the armature and stator windings causing rotation of the motor shaft 30.

In contrast to the prior art, however, the leadless capacitor 20 according to the present invention is provided without solid lead wires attached to the capacitor plates 31, 32, and without an epoxy coating. Instead, the capacitor comprises only the opposed plates 31, 32 separated by a dielectric 33. To obtain the highest possible RFI suppression and the greatest reduction of conducted transients, the capacitor is assembled to the motor terminals by a mechanical fit between the capacitor plates 31, 32 and the positive and negative terminals. In addition to maximizing RFI and conducted transient suppression by eliminating the capacitor lead wires, this configuration eliminates the two assembly operations (weld, solder, or splice) of attaching the capacitor lead wires into the motor power circuit. This simplifies assembly resulting in a reduction in assembly labor and cost. Also, the capacitor 20 without lead wires and an epoxy coating is less expensive to purchase from the manufacturer. Thus, a further cost reduction is achieved.

Figure 3:
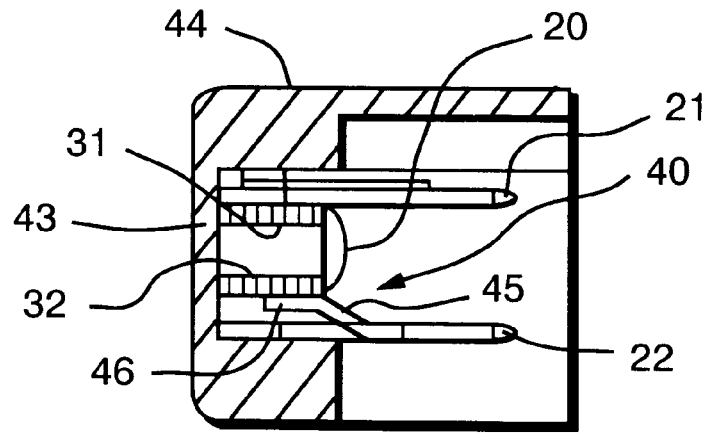
FIG. 3: is a sectional view of the capacitor connection to the motor input terminals shown in FIG. 2 taken along lines III—III.
Figure 4:
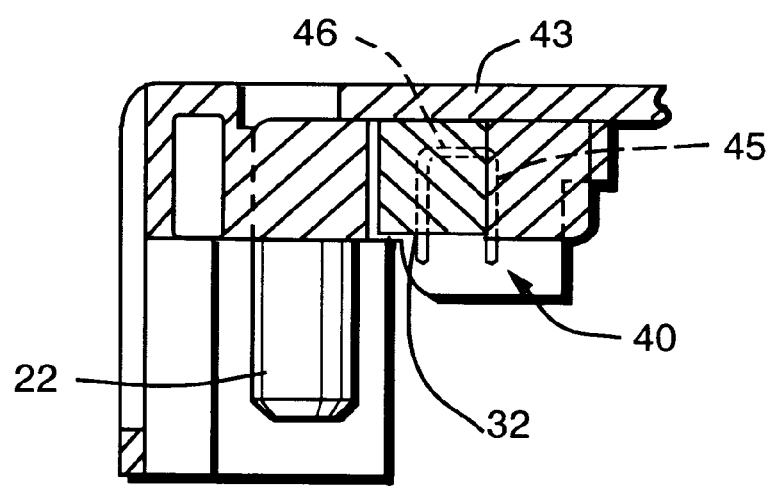
FIG. 4: is a sectional view of the capacitor connection to the motor input terminals shown in FIG. 2 taken along lines IV—IV.

A preferred method of accomplishing the mechanical fit between the capacitor plates and the motor input terminals is shown in FIG. 2, and more particularly in FIGS. 3–4. It is to be understood, however, that many designs for accomplishing this mechanical fit would be apparent to those skilled in the art. As shown best in FIGS. 3 and 4, in the preferred embodiment, a conducting metallic tab 40 is formed on one of the terminals 22. The tab 40 extends from the terminal 22 toward the interior wall 43 of the motor casing 44 and includes an angled portion 45 and a flat contact portion 46.

As shown, during assembly of the motor, the capacitor is snap-fit between the terminal 21 and the tab 40 so that one of the capacitor plates 31 is in direct physical contact with the terminal 40, and the other of the capacitor plates 32 contacts the flat portion 46 of the conducting tab 40 to electrically connect the plate 32 to the terminal 22. The angled portion 45 of the tab 40 is angled relative to the terminal 22 to cause a spring action which mechanically secures the leadless capacitor 20 between the terminal 31 and the tab 40. As the capacitor is inserted between the terminal 31 and the tab 40, the tab 40 flexes downward, thereby forcing the capacitor upward against the terminal 31. Thus configured, a reliable electrical connection is made between the capacitor plates and the electrical terminals.

Thus, according to the present invention there is provided an electric motor input circuit having a leadless capacitor which reliably and efficiently provides the highest possible level of RFI suppression and the greatest reduction in conducted voltage transients. The assembly includes a capacitor having no solid lead wires and no epoxy coating which is snap-fit into the motor input circuit so that one of the capacitor plates is in pressing engagement with one of the input terminals and the other of the capacitor plates is in pressing engagement with a conducting tab. The conducting tab is formed as part of the other of the input terminals, and the capacitor is, therefore, connected in between the terminals without the use of solid capacitor leads.

In addition to the advantages relating to RFI and conducted transient suppression, the two assembly operations of attaching capacitor lead wires to the motor input terminals are eliminated. This results in a more efficient assembly process and a corresponding reduction in assembly labor. In addition, the capacitor without the leads and the epoxy is less expensive to purchase from the manufacturer.

The embodiments which have been described herein, however, are but some of the several which utilize this invention and are set forth here by way of illustration but not of limitation. For example, many different mechanical configurations could be employed to secure the capacitor to the motor terminals. For example, the capacitor could be secured directly between the two terminals with no conducting tab, or between two conducting tabs formed on the two terminals. In addition, although the invention has been described with respect to assembly of the capacitor in a DC motor, it is to be understood that the present invention applies equally to AC and DC motors. In an AC motor the capacitor may function as a "start" or "run" capacitor, but may be secured to the motor power circuit in a manner according to the present invention. It is obvious that many other embodiments, which will be readily apparent to those skilled in the art, may be made without departing materially from the spirit and scope of this invention.

What is claimed is:

1. An electric motor input circuit comprising:
   first and second motor input terminals for receiving input power to said motor;
   a conducting tab formed on said second input terminal; and
   a leadless capacitor having a pair of opposed plates connected between said terminals, a first one of said pair of opposed plates being in direct physical contact with said first input terminal, and a second one of said pair of opposed plates being in direct physical contact with said conducting tab.

2. An electric motor input circuit according to claim 1 wherein said conducting tab comprises an angled portion with a flat contact portion on an end thereof, and wherein said second one of said pair of opposed plates is in direct physical contact with said flat contact portion.

3. An electric motor input circuit comprising:
   first and second motor input terminals for receiving input power to said motor;
   a leadless capacitor having a pair of opposed plates connected between said terminals, a first one of said pair of opposed plates being in direct physical contact with said first input terminal, and a second one of said pair of opposed plates being in electrical contact with said second input terminal.

4. An electric motor input circuit according to claim 3 wherein, said circuit further comprises a conducting tab formed on said second input terminal, and wherein said second one of said pair of opposed plates is in direct physical contact with said conducting tab.

5. An electric motor input circuit according to claim 4 wherein said conducting tab comprises an angled portion with a flat contact portion on an end thereof, and wherein said second one of said pair of opposed plates is in direct physical contact with said flat contact portion.

6. A method of assembling a capacitor to an electric motor input circuit comprising:

providing an electric motor having a first and a second input terminal;

providing a leadless capacitor having a pair of opposed plates;

securing said leadless capacitor between said terminals with a first one of said pair of opposed plates being in direct physical contact with said first terminal and a second one of said pair of opposed plates being in electrical contact with said second terminal.

7. A method according to claim 6, said method further comprising forming a conducting tab on said second terminal, and wherein said second one of said pair of opposed plates is in direct physical contact with said conducting tab.

8. A method according to claim 7 wherein said conducting tab comprises an angled portion with a flat contact portion on an end thereof, and wherein said second one of said pair of opposed plates is in direct physical contact with said flat contact portion.

* * * * *